United States Patent [19]

Joo

[11] Patent Number: 5,757,786
[45] Date of Patent: May 26, 1998

[54] TIME SYNCHRONIZATION APPARATUS AND A METHOD THEREOF USING A GLOBAL POSITIONING SYSTEM OF A SATELLITE

[75] Inventor: Hwan-Yong Joo, Kyonggi-Do, Rep. of Korea

[73] Assignee: Hyundai Electronics Industries Co., Ltd., Kyonggi-Do, Rep. of Korea

[21] Appl. No.: 364,236

[22] Filed: Dec. 27, 1994

[30] Foreign Application Priority Data

Dec. 27, 1993 [KR] Rep. of Korea ............... 93-29734

[51] Int. Cl.⁶ ................................................ H04L 7/00
[52] U.S. Cl. ........................ 370/324; 370/516; 375/371
[58] Field of Search ................................ 370/503, 516, 370/517, 518, 507, 520, 315, 316, 324, 350; 375/354, 355, 356, 362, 376, 358, 359, 371; 331/46–48

[56] References Cited

U.S. PATENT DOCUMENTS

| | | | |
|---|---|---|---|
| 4,513,259 | 4/1985 | Frerking | 331/176 |
| 4,525,685 | 6/1985 | Hesselberth et al. | 331/10 |
| 4,582,434 | 4/1986 | Plangger et al. | 368/46 |
| 4,602,375 | 7/1986 | Inukai | 375/358 |
| 4,807,259 | 2/1989 | Jamanaka et al. | 375/358 |
| 5,274,545 | 12/1993 | Allan et al. | 364/148 |
| 5,319,374 | 6/1994 | Desai et al. | 342/387 |

Primary Examiner—Douglas W. Olms
Assistant Examiner—Ricky Q. Ngo
Attorney, Agent, or Firm—Oblon, Spivak, McClelland, Maier & Neustadt, P.C.

[57] ABSTRACT

A time synchronization apparatus and a method using a GPS (Global Positioning System) of a satellite. An oscillator oscillates a frequency required for a Global Positioning System of a satellite. A counter generates an internal 1 pps by counting the oscillating frequency of the oscillator. A comparator outputs a phase difference by comparing the phase of the internal 1 pps outputted from the counter and the phase of the 1 pps signal received by the Global Positioning System. A buffer stores the phase difference comparison output of the comparator. A first controller corrects the phase difference of the internal 1 pps outputted from the counter. A second controller corrects an oscillating frequency outputted from the oscillator and the phase difference of the output frequency of the first controller. A microprocessor synchronizes time using the tracing state signals of the Global Positioning System detected from the Global Positioning System and the phase difference comparison output stored in the buffer and for providing the phase difference correction signals to the first controller and the second controller for the correction of the phase difference and for outputting the frequency error value. A digital/analog converter converts the error value outputted from the microprocessor unit into the digital/analog signals and transmits the converted signals to the operating control signals of the oscillator for adjusting the oscillating frequency of the oscillator.

8 Claims, 3 Drawing Sheets

TIME SYNCHRONIZATION APPARATUS AND A METHOD THEREOF USING A GLOBAL POSITIONING SYSTEM OF A SATELLITE

BACKGROUND OF THE INVENTION

1. Field of the Invention

The present invention relates in general to a time synchronization apparatus and a method thereof using a GPS (Global Positioning System) of a satellite, and in particular to the apparatus and the method thereof capable of providing a correct time information having an error range within 100 ns using a clock of the GPS.

2. Description of the Conventional Art

Conventionally, the time synchronization system of the GPS of a satellite is directed to provide a correct time information by computing a frequency error value of an internal oscillator, an error value of drifter and a phase difference error value of the GPS satellite clock and the frequency of the internal oscillator by correcting an operation of the internal oscillator in response to the computed result value.

The conventional time synchronization system requires too much time for correcting the frequency error, and in particular when the satellite is in the range of non-service location, the accuracy of the correctness can not be secured thereby.

SUMMARY OF THE INVENTION

Accordingly, it is an object of the present invention to provide a time synchronization apparatus and a method thereof using a global positioning system of a satellite.

It is another object of the present invention to provide the apparatus and the method thereof capable of providing a stable precise time information having an error range within 100 ns by obtaining a GPS 1 pps (One Pulse Per Second) signal from the GPS satellite signals when the GPS satellite is in the range of the service location, so that the precise time information can be secured having the error range within 100 ns in a consideration of the characteristics of the obtained GPS 1 pps and the internal oscillator.

To achieve the objects of the present invention, the present invention includes an oscillator for oscillating a frequency required to a Global Positioning System of a satellite; a counter for generating an internal 1 pps by counting the oscillating frequency of the oscillator; a comparator for outputting a phase difference by comparing the phase of the internal 1 pps outputted from the counter and the phase of the Global Positioning System outputted from the global Positioning System; a buffer for storing the phase difference comparison output of the comparator; a first controller for correcting the phase difference of the internal 1 pps outputted from the counter; a second controller for correcting an oscillating frequency outputted from the oscillator and the phase difference of the output frequency of the first controller; a microprocessor for synchronizing time using the tracing state signals of the Global Positioning System detected from the Global Positioning System and the phase difference comparison output stored in the buffer and for providing the phase difference correction signals to the first controller and the second controller for the correction of the phase difference and for outputting the frequency error value; and a digital/analog converter for converting the error value outputted from the microprocessor unit into the digital/analog signals and for transmitting the converted signals to the operating control signals of the oscillator and for adjusting the oscillating frequency of the oscillator.

DESCRIPTION OF THE PREFERRED EMBODIMENTS

Figure 1:
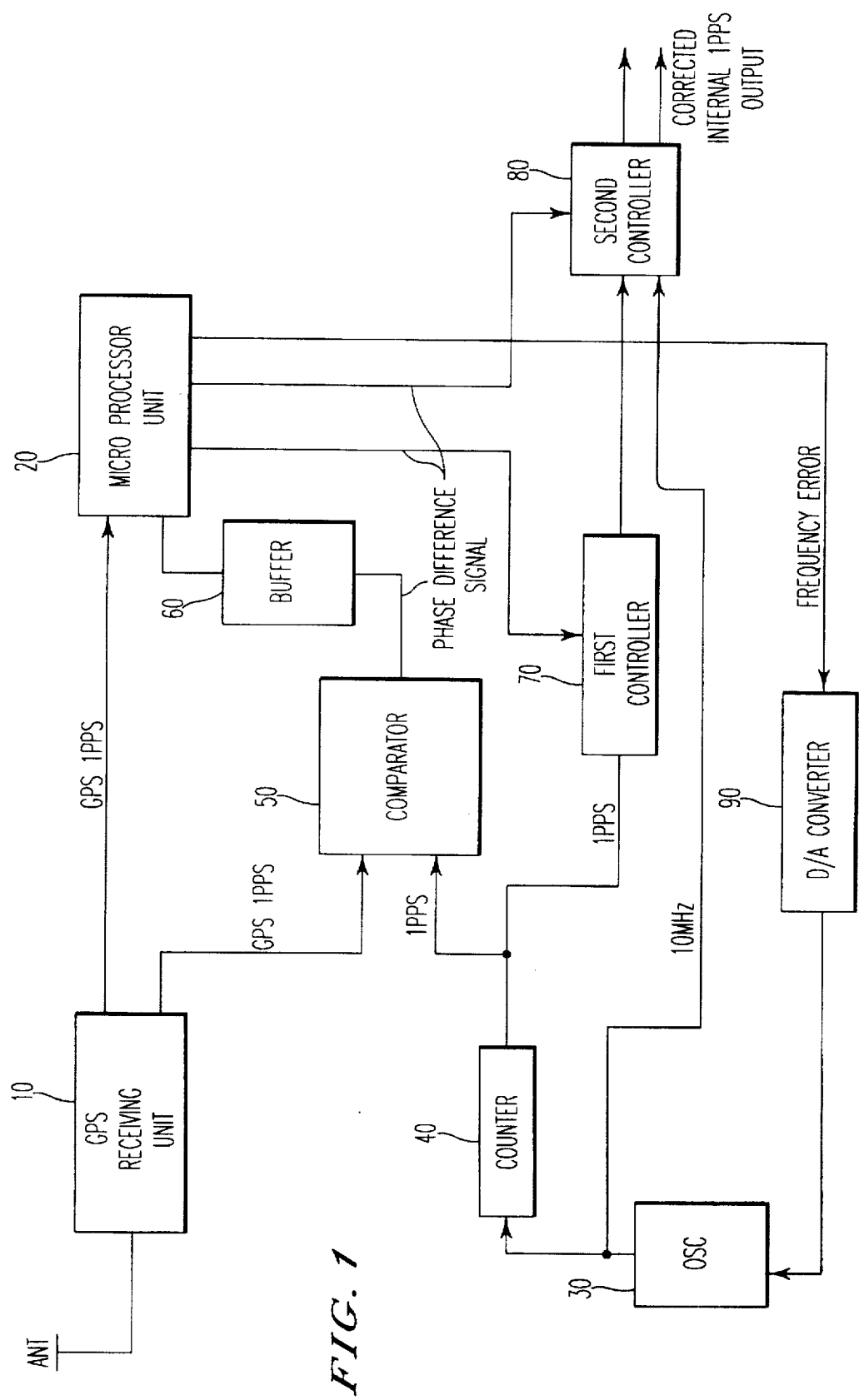
FIG. 1 is a block diagram showing a time synchronization apparatus using a GPS of a satellite according to the present invention.

Referring to FIG. 1, the present invention includes a GPS receiving unit 10 for receiving the GPS 1 pps by receiving the clock information from the GPS satellite. An oscillator 30 oscillates at the frequency required according to the GPS. A counter 40 counts an internal 1 pps by counting the oscillating frequency of the oscillator 30. A comparator 50 compares the internal 1 pps of the output signals of the counter 40 and the GPS system 1 pps of the output signals of the GPS receiving unit 10. A buffer 60 outputs the compared value outputs from the comparator 50. A first controller 70 corrects the phase difference of the internal 1 pps of the output signals of the counter 40 by a unit of 1 µs. A second controller 80 corrects the oscillating frequency of the oscillator 30 and the phase difference of the output frequency of the first controller 70 to have the range value of 1–995 ns by a 5 ns unit. Finally, a microprocessor unit 20 synchronize the time using the tracing state signals of the GPS detected by the GPS receiving unit 10 and the comparative output data stored at the buffer 60. In addition, the present invention further includes a digital/analog converter 90 for maintaining the precise oscillator state by converting the frequency difference value outputted from the microprocessor unit 20 into the digital/analog signals and providing the converted signals to the control signals of the oscillator 30.

When the microprocessor unit 20 recognizes that the GPS satellite is traced by the satellite state detecting signals inputted from the GPS receiving unit 10, the time synchronization control function for the GPS 1 pps outputted from the GPS receiving unit 10 is conducted thereby. The frequency oscillated from the internal oscillator 30 is counted to the internal 1 pps by the counter 40 and the phase difference of the internal 1 pps is compared with a phase difference to the GPS 1 pps. The compared output of the comparator 50 is stored in the buffer 60. The microprocessor unit 20 synchronizes the time using the compared data stored in the buffer 60, outputs the phase difference correction signals and computes the frequency error value. The first controller 70 corrects the signals of the counter 40 by a unit of 1 µs in response to the phase difference correction signals from the microprocessor unit 20. The second controller 80 corrects the phase difference between the oscillating frequency of the oscillator 30 and the frequency outputted from the first controller 70 to be in a range from 1 ns to −995 ns by 5 ns unit. In addition, the microprocessor unit 20 converts the computed frequency error to the analog value through the digital/analog converter 90 and provides the converted signals to the control signals of the oscillator 30 for precisely controlling the oscillating frequency of the oscillator 30. The precise time information can be secured through the aforementioned procedures. Here, the phase error $t_k$ repeated at the internal oscillator can be expressed in a following formula:

$$t_k = t_o + k(1+f) = k^2 d + \delta_k,$$

where $t_o$ is an initial phase error, f is a frequency error $(=f_1-f_o)/f_o$, d is a drifter error, and $\delta_k$ a random error related to the kth pulse. $t_o$, f and d are variables.

Meanwhile, if the satellite tracing state cannot be secured or if the receiving signals are affected by heat damage, the operating characteristics of the oscillator are maintained at the corrected state.

Figure 3:
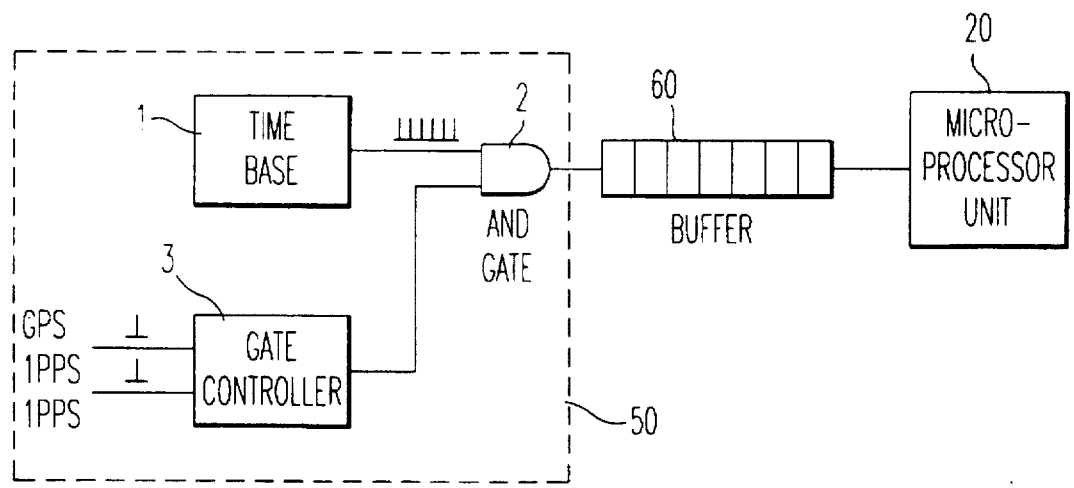
FIG. 3 is a block diagram showing an internal structure of a comparator of FIG. 1.
Figure 4:
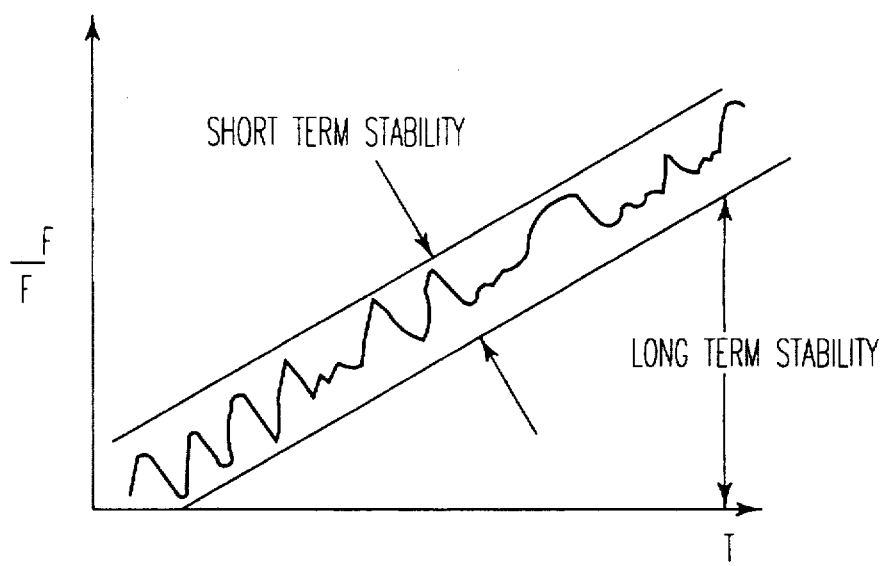
FIG. 4 is a graph showing a stability curve of the comparator of FIG. 1.

Referring to FIG. 3, there is shown a block diagram of the comparator 50 in FIG. 1. A time base unit 1 for generating clock signals is included. A gate controller 3 is provided for receiving the GPS 1 pps of the output signals of the GPS receiving unit 10 and the internal 1 pps of the output signals of the counter 40 as the input signals. Finally, an AND-gate for ANDing the output signals of the gate controller 3 and the clocks of the output of the time base 1 is provided. The stability curve of the comparator 50 is shown 6 in FIG. 4, which is obtained through analyzing the phase difference compared value obtained from the comparator 50. The short term stability thereof is dependent to its specific changes of the GPS 1 pps and the long term stability is dependent to the frequency error value of the internal oscillator.

Figure 2:
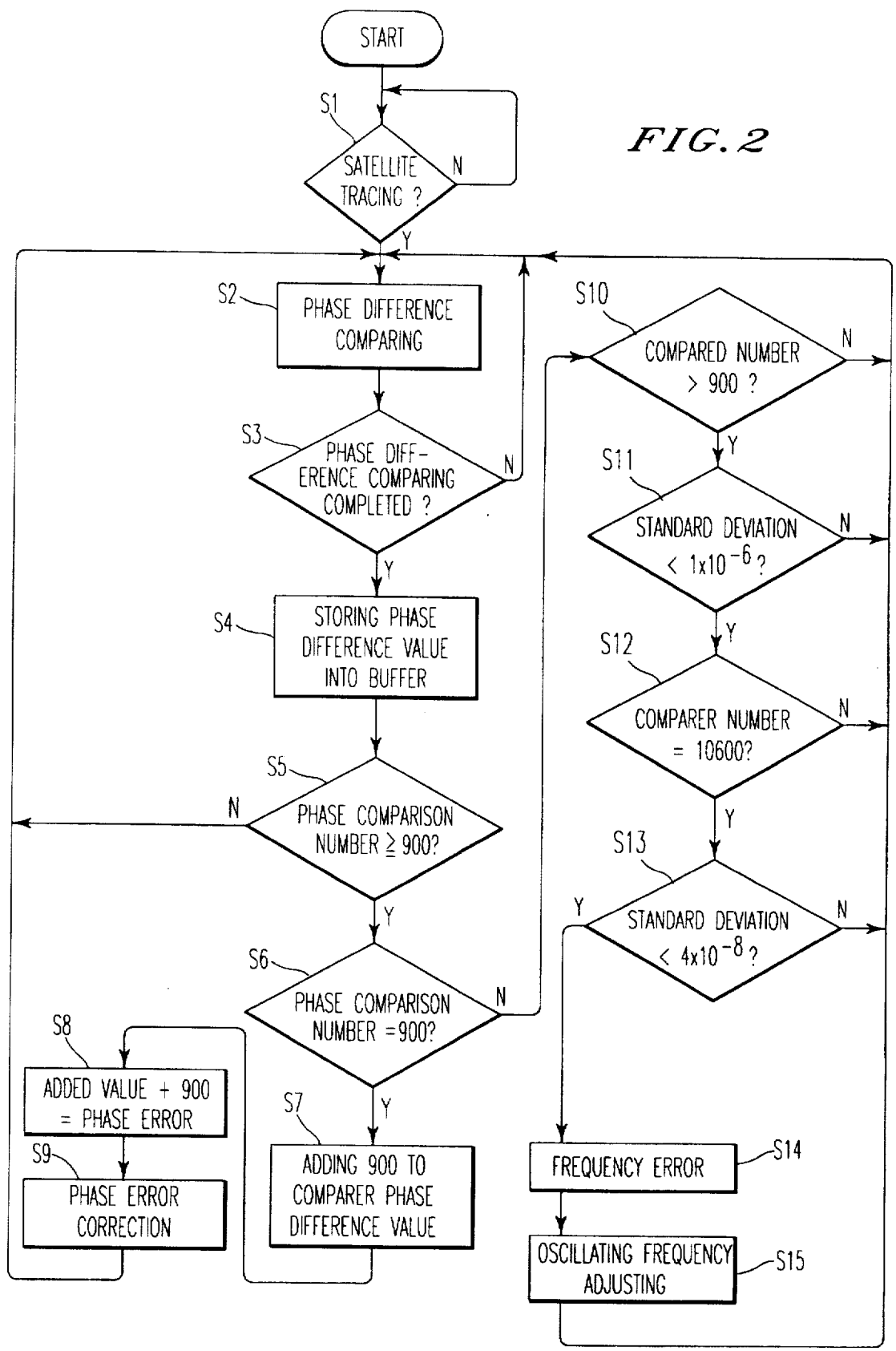
FIG. 2 is a flow chart of the time synchronization processing at the microprocessor unit of FIG. 1.

The time synchronous processing functions conducted by the microprocessor unit 20 are shown in FIG. 2.

Referring to FIG. 2, the time synchronous control functions of the microprocessor unit 20 are classified into the following steps S1 to S15. That is, the microprocessor unit 20 includes a first step S1 of recognizing that the phase tracing state is available through the GPS receiving unit 10. A second step S2 compares the phase difference of the GPS 1 pps and the internal 1 pps through the comparator 50. A third step S3 determines if the comparison is completed. A fourth step S4 stores the phase difference value into the buffer 60. A fifth step S5 determines whether the number of comparisons is over, for example, 900. A sixth step S6 determines when the number of the comparison is, for example, 900. A seventh step S7 adds the compared phase difference of all 900 values. An eighth step computes the phase difference error by dividing the added value by 900. A ninth step S9 performs a correction routine for the phase difference. A tenth step S10 determines when the number of the phase difference comparison is over, for example, 900. An eleventh step S11 determines when the standard deviation is smaller than, for example, $1\times10^{-6}$, and if the standard deviation is larger than, for example, $1\times10^{-6}$, the routine returns to the step S2. A twelfth step S12 determines that the number of the comparison is, for example, 10600 while storing the comparison data in case that the standard deviation is smaller than, for example, $1\times10^{-6}$. A thirteenth step S13 determines that the standard deviation is smaller than, for example, $4\times10^{-8}$ when the number of the comparison is, for example, 10600. A fourteenth step S14 computes the frequency error when the standard deviation is smaller than, for example, $4\times10^{-8}$. A fifteenth step S15 adjusts the oscillating frequency of the oscillator 30 while the frequency error value is converted to a digital value at the converter 90 and transfers the digital value to the oscillator 30. Meanwhile, if the standard deviation is larger than, for example, $4\times10^{-8}$, the routine returns to the step S2.

The present invention provides precise timing information having an error within 100 ns using the GPS satellite and therefore it has useful applications to systems, such as the integrated information network, the digital mobile communication station and the satellite communication network station.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A time synchronization apparatus using a global positioning system of a satellite receiving a 1 pps signal from the satellite, comprising:

an oscillator for generating an oscillating frequency signal compatible with a global positioning system of a satellite;

a counter for generating an internal 1 pps by counting the oscillating frequency of the oscillator;

a comparator for outputting a phase difference signal by comparing a phase of the 1 pps signal received by the global positioning system and the internal 1 pps outputted from the counter;

a first controller for phase correcting the internal 1 pps outputted from the counter based on said phase difference signal;

a second controller for correcting the phase difference between the output frequency of the first controller and the oscillating frequency signal; and a microprocessor for providing the phase difference signal outputted from the comparator to the first and second controllers for phase difference corrections, and for outputting a frequency error value to the oscillator for correcting the frequency of the oscillating frequency signal on the basis of the GPS 1 pps signal.

2. The apparatus of claim 1, wherein said comparator further comprises:

a time base unit for generating a predetermined clock;

a gate controller having a first input coupled to the global positioning system 1 pps outputted from the global positioning system, and a second input coupled to the internal 1 pps outputted from the counter; and an AND-gate for Anding an output of the gate controller and an output of the time base.

3. The time synchronization apparatus according to claim 1, further comprising:

a buffer for storing a phase difference comparison output of the comparator; and a digital/analog converter for converting the frequency error value outputted from the microprocessor unit into analog signals, for transmitting the converted signals to operating control signals of the oscillator to adjust the oscillating frequency of the oscillator.

4. The time synchronization apparatus according to claim 1, wherein the microprocessor further comprises:

means for iterating the comparison of the 1 pps signal and the internal 1 pps signal by the comparator a first plurality of times;

means for computing an average value of the phase difference values over all said first plurality of times;

means for determining whether the average value is within a first standard deviation number;

means for iterating the comparison of the 1 pps signal and the internal 1 pps signal by the comparator a second plurality of times when the first standard deviation is achieved;

means for determining whether the average value is within a second standard deviation number, being smaller than the first deviation number; and means for calculating said frequency error value after said standard deviation number is achieved.

5. The time synchronization apparatus according to claim 4, wherein:

said first plurality of times is 900; and said second standard deviation is $4 \times 10^{-8}$.

6. The time synchronization method using a global positioning system of a satellite, comprising the steps of:

a first step of detecting whether a global positioning system tracing state exists and for generating a global positioning system 1 pps;

a second step of oscillating at a frequency required for the global positioning system and for generating an internal 1 pps from an oscillating frequency;

a third step of comparing a phase difference of the internal 1 pps and the global positioning system 1 pps;

a fourth step of computing the phase difference value compared at the third step when the first step detects the global positioning system tracing state and for computing an average value of the phase difference; and a fifth step of correcting a phase error using the average value of the phase difference from the fourth step and for adjusting the frequency oscillated from the second step.

7. The method of claim 6, further comprises:

a fifth step, wherein said fourth step is reiterated at least 900 times in a predetermined number of the phase difference value from the fourth step;

a seventh step first adding all of the phase differences to generate a total phase difference value;

an eigth step of calculating an average value of the phase difference by dividing the total phase difference value by 900; and a ninth step of correcting a phase of the GPS 1 pps using the average value of the phase difference.

8. The method of claim 7, wherein a tenth step determines when the number of reiterations of the fourth step is over a predetermined number and executes the further steps of:

an eleventh step of judging whether a standard deviation of the average value of the phase difference is smaller than $1 \times 10^{-6}$;

a twelfth step of judging whether the number of the phase difference value compared at the fourth step is 10600 when the standard deviation from the eleventh step is smaller than $1 \times 10^{-6}$;

a thirteenth step of judging whether the standard deviation is smaller than $4 \times 10^{-8}$ when the phase difference value from the twelfth step is 10600; and a fourteenth step of adjusting a frequency oscillated at the second step when the standard deviation from the thirteenth step is smaller than $4 \times 10^{-8}$.

* * * * *